(No Model.)

C. E. W. WOODWARD.
RIM AND TIRE FOR WHEELS.

No. 481,340. Patented Aug. 23, 1892.

UNITED STATES PATENT OFFICE.

CHARLES E. W. WOODWARD, OF CHICOPEE, MASSACHUSETTS, ASSIGNOR TO THE OVERMAN WHEEL COMPANY, OF SAME PLACE.

RIM AND TIRE FOR WHEELS.

SPECIFICATION forming part of Letters Patent No. 481,340, dated August 23, 1892.

Application filed February 16, 1891. Serial No. 381,701. (No model.)

*To all whom it may concern:*

Be it known that I, CHARLES E. W. WOODWARD, of Chicopee, in the county of Hampden and State of Massachusetts, have invented a new Improvement in Rims and Tires for Vehicle-Wheels; and I do hereby declare the following, when taken in connection with accompanying drawings and the letters of reference marked thereon, to be a full, clear, and exact description of the same, and which said drawings constitute part of this specification, and represent, in—

Figure 1:
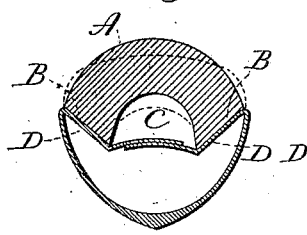
Figure 2:
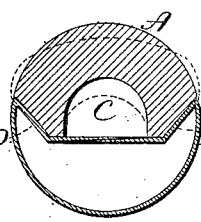
Figure 3:
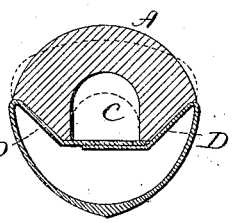
Figure 4:
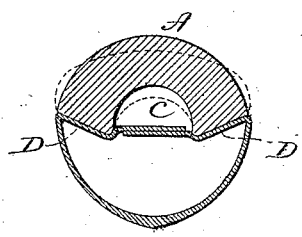

Figure 1, a view in transverse section of a tire and rim constructed in accordance with my invention, and Figs. 2, 3, and 4 similar views of modified forms which the invention may assume.

My invention relates to an improvement in rubber wheel-tires of arch-shaped transverse section and wheel-rims therefor, the object being to provide a durable and strong construction in which radial and lateral pressure on the tires is equalized, a full action of the rubber secured, glancing or tearing strain upon the surfaces of adhesion avoided, and lightness and cheapness attained without sacrifice of a free cushioning action.

With these ends in view my invention consists in the combination, with an arch-shaped rubber wheel-tire having the edges of its side walls made flat in cross-section and beveled or inclined toward each other at an angle of about forty-five degrees, of a wheel-rim having its bed constructed with two annular seats made flat in cross-section and inclined toward each other in conformity with the inclination of the edges of the tire.

The rubber tires A shown in the several figures of the drawings are arch-shaped in transverse section and substantially alike, differing only in the minor variations of form. The edges of the side walls of each of these tires are made flat in cross-section, as at B B, and beveled or inclined toward each other at an angle of about forty-five degrees on lines converging to a point located below the center of the interior arch-shaped space C of the tire.

The beds of the wheel-rims are provided with annular seats D D, flat or straight in cross-section and conforming in width and inclination to the inclined or beveled edges of the tire.

As herein shown, each wheel-rim is made of one piece of sheet metal, the edges whereof are lapped in the center of its bed and between its annular seats; but I do not limit myself to rims of any particular construction so long as they are provided with two annular seats flat in cross-section and inclined toward each other in conformity with the inclined or beveled edges of the side walls of the tire.

As shown in Figs. 1 and 4 of the drawings, the full width of the edges of the side walls of the tires are beveled and the inclined seats of the rim-beds made accordingly; but in Figs. 2 and 3 the bevels are not carried quite to the inner edges of the side walls of the tire, which therefore rests in part upon the flat central portions D' of the rims. The dotted lines shown in these figures give the approximate shape of the tires under pressure and the direction of their displacement. The transverse area is supposed to be equal whether the tires are under compression or not.

By beveling the edges of the side walls of the tires and providing the beds of the rims with annular seats flat in cross-section and inclined in conformity with the edges of the side walls of the tires, all as described, the radial and lateral pressure upon the tires is better equalized and distributed between the two seats and edges of the tires and rims and the edgewise thrust of the tires brought, so to speak, more perpendicularly upon the seats and glancing or tearing strain upon the surfaces of adhesion better avoided than when the seats and edges are made with curved surfaces. Further advantages flowing from my improved construction are reduction of weight and saving in cost, as a less amount of rubber in the same section of tire and rim is required than in other forms of arched tires. The construction of the rim is also favored by the present invention, as no very acute angles are formed in the metal to weaken or strain the fibers thereof, while its form gives it great strength both laterally and radially.

It is obvious that a tire having a lower arch than any herein shown, and yet of sufficient capacity for the required inward displacement can be made, as this form of tire has its greatest radial thickness or depth under its center or crown, where there is the greatest displacement, this depth being gradually lessened toward the other edges of the tire where there is the least displacement.

I do not in this application claim archshaped tires, broadly; nor do I broadly claim the combination, with a tire having its edges inclined toward each other, of a wheel-rim having its bed furnished with correspondingly-inclined surfaces.

Having fully described my invention, what I claim as new, and desire to secure by Letters Patent, is—

The combination, with an arch-shaped rubber wheel-tire having the edges of its side walls made flat in cross-section and beveled or inclined toward each other at an angle of about forty-five degrees, of a wheel-rim having its bed constructed with two annular seats made flat in cross-section and inclined toward each other in conformity with the inclination of the edges of the tire, substantially as described.

In testimony whereof I have signed this specification in the presence of two subscribing witnesses.

CHARLES E. W. WOODWARD.

Witnesses:
JAMES L. PEASE,
JAMES H. LOOMIS.